United States Patent [19]

Labaziewicz

[11] Patent Number: 4,814,805
[45] Date of Patent: Mar. 21, 1989

[54] FILM EXPOSURE COUNTER

[75] Inventor: Peter Labaziewicz, Rochester, N.Y.

[73] Assignee: Eastman Kodak Company, Rochester, N.Y.

[21] Appl. No.: 152,283

[22] Filed: Feb. 4, 1988

[51] Int. Cl.$^4$ .............................................. G03B 1/66
[52] U.S. Cl. .................................................. 354/217
[58] Field of Search ......................................... 354/217

[56] References Cited

U.S. PATENT DOCUMENTS

| | | | |
|---|---|---|---|
| 4,400,074 | 8/1983 | Akiyama et al. | 354/173 |
| 4,676,621 | 6/1987 | Desormeaux | 354/173.1 |
| 4,707,096 | 11/1987 | Lawther | 354/215 |

FOREIGN PATENT DOCUMENTS 57-55614 12/1952 Japan .

*Primary Examiner*—Michael L. Gellner
*Attorney, Agent, or Firm*—Roger A. Fields

[57] ABSTRACT

Automatic film advance in a camera to wind a film leader onto a take-up spool requires that an override switch be temporarily closed to nullify a film metering switch. Otherwise, the metering switch will de-energize a motorized film drive after the film leader is advanced only a single frame width, rather than the required several frame widths. To ensure that a mechanical exposure counter is rotated sufficiently from an initialized setting to close the override switch, when a drive member for the counter is rotated less than its normal distance because of lost motion in actuating the drive member following previous rewind of an exposed film off the take-up spool, the drive member and the counter include cooperating means adapted to rotate the counter the same angular distance from its initialized setting as the angular distance the counter is rotated from successive settings, with less rotation being required of the drive member during its first revolution.

9 Claims, 5 Drawing Sheets

FILM EXPOSURE COUNTER

BACKGROUND OF THE INVENTION

1. Field of the Invention

The invention relates generally to the field of photography, and more particularly to a frame or exposure counter for a camera.

2. Description of the Prior Art

Typically in many known 35 mm cameras, there is included a motorized film transport mechanism. In operation, a leading end portion of the filmstrip extending from a light-tight cartridge loaded in the camers is attached automatically to a take-up spool. The take-up spool is rotated after each exposure to advance successive frames of the filmstrip from the cartridge across the focal plane of a taking lens and onto the take-up spool. Each time the take-up spool is rotated, a single unexposed frame of the filmstrip is located in the focal plane of the taking lens and a preceding exposed frame is wound onto the take-up spool. At the same time, a frame or exposure counter is incremented by rotation of a metering sprocket in engagement with successive perforations in the filmstrip to provide a count of the number of frames exposed or remaining to be exposed on the filmstrip.

FIGS. 1-4 of the accompanying drawings are a detailed representation of a prior art exposure counter in a 35 mm camera. Usually the metering sprocket, now shown, and a metering gear 1 are coaxially coupled to allow the two to rotate in unison. The metering gear 1 continuously engages an intermediate gear 3 which in turn continuously engages a drive gear 5. A cylindrical drive member 7 is coaxially fixed atop the drive gear 5 and has a single v-shaped recess 9 for receiving respective peripheral teeth 11 of a rotatable counter disk 13, to rotate the disk in accordance with rotation of the metering sprocket as the filmstrip is advanced by the motorized transport as the filmstrip is advanced by the motorized transport mechanism. The counter disk 13 has thirty-six evenly spaced numerical settings designated by the numbers "1, 2, 3, 4, 5 . . . 36" imprinted on the disk at corresponding locations, a starting or preliminary setting designated by the letter "S" imprinted on the disk at a location preceding the number "1", and two similarly spaced intermediate settings designated by respective dots ". . " imprinted on the disk at corresponding locations between the "S" and the "1". Each of these settings is separated from the next one by a space equivalent to slightly more than the width of the respective frames of the filmstrip. Thus, when visible in a window 15 of the camera, the numbers "1-36" indicate successive frames, the letter "S" usually indicates that the camera is empty, and the dots ". . " indicate that a leader section of the filmstrip is being advanced onto the take-up spool.

When a rear door 17 of the camera is opened as shown in FIG. 2, a separating spring 19 urges a swing arm 21 to pivot counter-clockwise about a shaft 23 for the intermediate gear 3. This causes the drive member 7 to move out of its position for engaging one of the peripheral teeth 11 of the counter disk 13. If the counter disk 13 is at a setting other than its starting setting "S" as shown in FIG. 1, an initializing spring 25 will urge the disk to rotate counter-clockwise to initialize the disk to the starting setting. A stop pin 27 secured to the underside of the counter disk 13 is disposed to contact a fixed pin 29 to halt the disk at its starting setting "S" as shown in FIG. 2.

When the rear door 17 is re-closed, it pivots the swing arm 21 clockwise about the shaft 23 to return the drive member 7 to a position within a gap 31 between a first one 11a of the peripheral teeth 11 of the counter disk 13 and a last one 11z of the teeth as shown in FIG. 3. If a film cartridge has been loaded in the camera and the motorized transport mechanism is energized, the leader section of the filmstrip will be advanced onto the take-up spool and a first frame will be positioned for exposure. Each time the filmstrip is advanced slightly more than the width of a single frame, the metering sprocket is rotated a single completion revolution, i.e. 360°. This will cause the drive member 7 to be similarly rotated in engagement with one of the teeth 11 of the counter disk 13, to rotate the disk the equivalent of one frame to its next setting. A metering switch, now shown, is normally opened each time the metering sprocket is rotated a complete revolution, to de-energize the motorized transport mechanism and thereby halt film advance. However, since the leader section of the filmstrip has a length equal approximately to three times the width of a single frame, a means must be provided for defeating the metering switch temporarily to allow the film leader to be wound without interruption onto the take-up spool in order to position a first frame for exposure. Specifically, as shown in FIGS. 1 and 2, the means comprises an override switch 33 which, when closed, nullifies the metering switch. In operation, after the counter disk 13 is rotated from its startng setting "S" and almost to its first intermediate setting ".", a cam rise 35 on a camming disk 37 coaxially fixed to the counter disk closes the override switch 33. The override switch 33 remains closed until a cam descent 39 on the camming disk 37 is rotated alongside the switch. This is timed to concur with rotation of the counter disk 13 to its second intermediate setting ".". Then, after the metering sprocket is rotated another revolution to coincide with advance of the filmstrip to position the first frame for exposure, the metering switch is re-opened to de-energize the motorized transport mechanism. Simultaneously, the counter disk 13 is indexed to its first numbered setting "1".

When the drive member 7 is rotated from a starting angular position, within a gap 31, adjacent the first tooth 11a of the counter disk 13 as shown in FIG. 3, it may or may not be rotated a complete revolution, i.e. 360°, at the conclusion of its first revolution. The reason for the drive member 7 being rotated less than a complete revolution is that they may be some lost motion due to gear backlash or other causes, when the motorized transport mechanism is first actuated following a previous reverse movement of the transport mechanism to rewind an exposed film back into the cartridge. If the drive member 7 is rotated a complete revolution, the counter disk 7 will be rotated sufficiently to temporarily close the override switch 33. That is, the counter disk 7 will be rotated from its starting setting "S" to its first intermediate setting ".". Conversely, if the drive member 7 is rotated less than a complete revolution, then, depending upon the starting angular position of the drive member, the counter disk 7 may or may not be rotated sufficiently to temporarily close the override switch 33. When the drive member 7 is in the starting angular position shown in FIG. 3, and it is rotated less than a complete revolution from that position, the drive member will engage the first tooth 11a of the counter disk 13 shortly after it is actuated. Consequently, the counter disk 13 will be rotated sufficiently to close the override switch 33. However, when the drive member 7 is in the starting angular position shown in FIG. 4, and it is rotated less than a complete revolution from that position (as indicated by the reference number 7' in FIG. 4), the drive member will not engage the first tooth 11a of the counter disk 13 until shortly before the end of its cycle. Consequently, the counter disk 13 will not be rotated sufficiently (as indicated by the reference number 11a' in FIG. 4) to close the override switch 33. In this instance, therefore, the override switch 33 will not nullify the metering switch and the motorized transport mechanism will be de-energized prematurely, before the first frame is positioned for exposure.

SUMMARY OF THE INVENTION

According to the invention there is provided an improved film exposure counter of the type wherein (a) preferably a counter disk has a plurality of settings including a startng setting, and is rotated from the starting setting to the other settings to indicate respective film exposures, and (b) a drive member is rotated in engaged relation with the counter disk to rotate the disk from its starting setting to its other settings, and wherein the improvement comprises:

cooperating means arranged on the counter disk and the drive member, operating irrespective of the starting angular position of the drive member, for enabling the drive member to rotate the counter disk substantially the same angular distance from its starting setting, when the drive member is rotated less than one complete revolution, as the angular distance the counter disk is rotated from its other settings, when the drive member is rotated one complete revolution.

With such an improvement, an override switch can be temporarily closed to nullify a metering switch, regardless of the starting angular position of the drive member, when the drive member is rotated less than a complete revolution from its starting angular position.

DETAILED DESCRIPTION OF THE PREFERRED EMBODIMENT

The invention is disclosed as being embodied preferably in a 35 mm camera. Because the features of this type of camera are generally well known, the description which follows is directed in particular to photographic elements forming part of or cooperating directly with the disclosed embodiment. It is understood, however, that other elements not specifically shown or described may take various forms known to persons of ordinary skill in the art.

Referring again to the accompanying drawings, FIGS. 5-11 show an improved frame counter 51 which is similar in certain respects to the prior art frame counter shown in FIGS. 1-4 and is improved in other respects. For the most part, details of the improved frame counter which are the same as for the prior art frame counter are not repeated in FIGS. 5-11. For example, like the prior art counter disk 13, an improved counter disk 53 has thirty-six evenly spaced numerical settings designated by the numbers "1, 2, 3, 4, 5 . . . 36" imprinted on the disk at corresponding locations, a starting or preliminary setting designated by the letter "S" imprinted on the disk at a location preceding the number "1", and two similarly spaced intermediate settings designated by respective dots ". . " imprinted on the disk at corresponding locations between the "S" and the "1". Each of these settings is separated from the next one by a space equivalent to slightly more than the width of the respective frames of the filmstrip. Thus, when visible in the window 15 of the camera, the numbers "1-36" indicate successive frames, the letter "S" usually indicates that the camera is empty, and the dots ".." indicate that a leader section of the filmstrip is being advanced onto the take-up spool.

Figure 1:
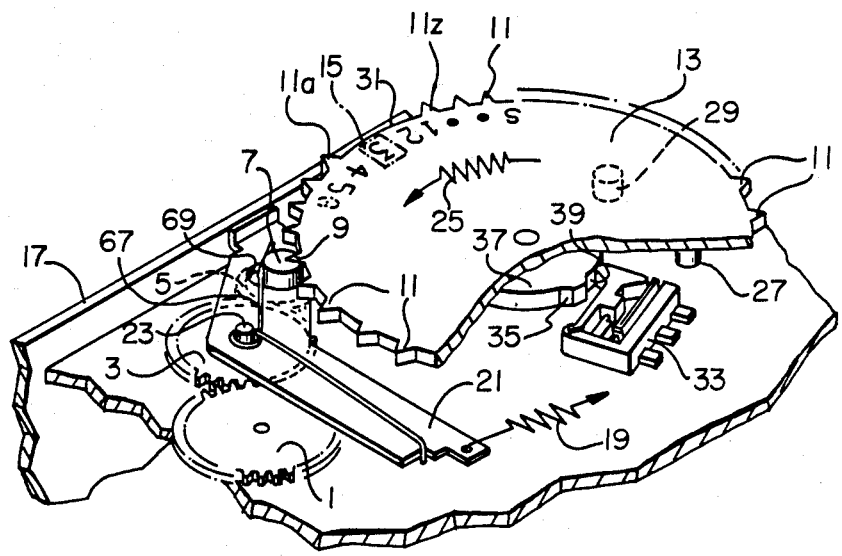
FIG. 1 is a perspective view of the prior art exposure counter, depicted with its counter disk rotated to a numbered setting.
Figure 2:
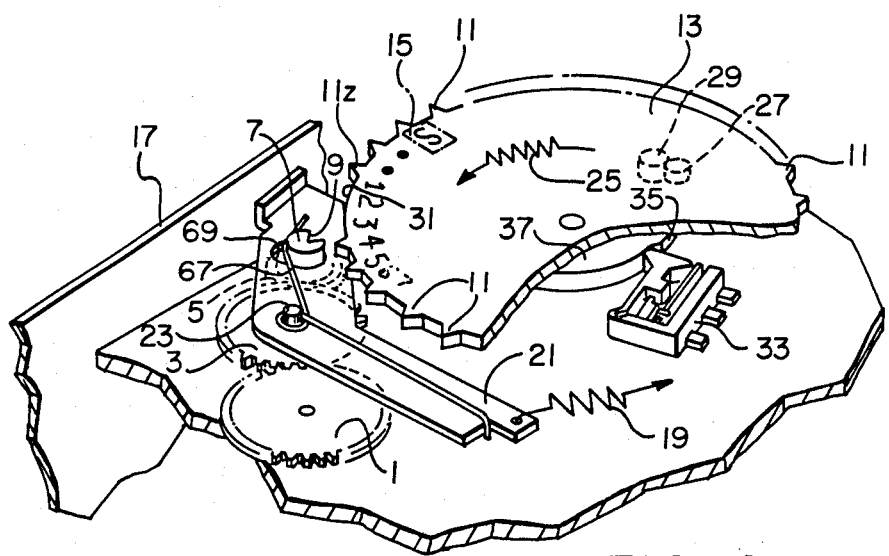
FIG. 2 is a perspective view of the prior art exposure counter, depicted with its counter disk initialized to a starting setting.
Figure 3:
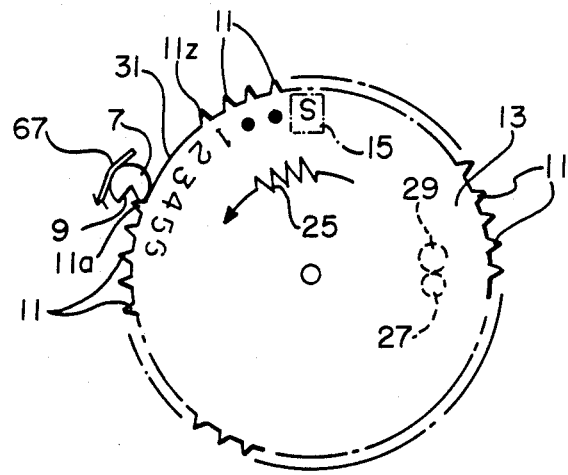
FIG. 3 is a plan view of the prior art exposure counter, depicted with its counter disk in the starting setting and a drive member in a particular starting angular position.
Figure 4:
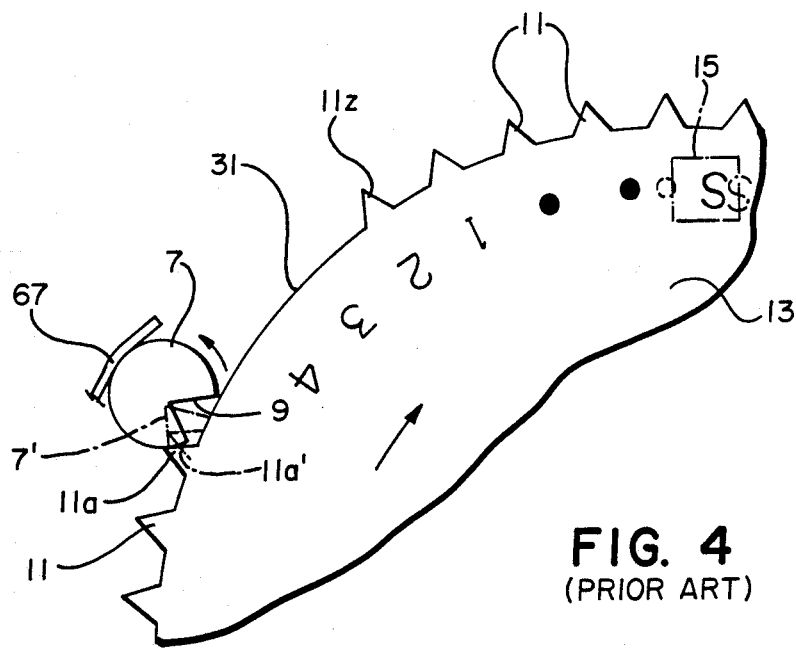
FIG. 4 is a plan view similar to FIG. 3, depicting the prior art drive member in another starting angular position.
Figure 5:
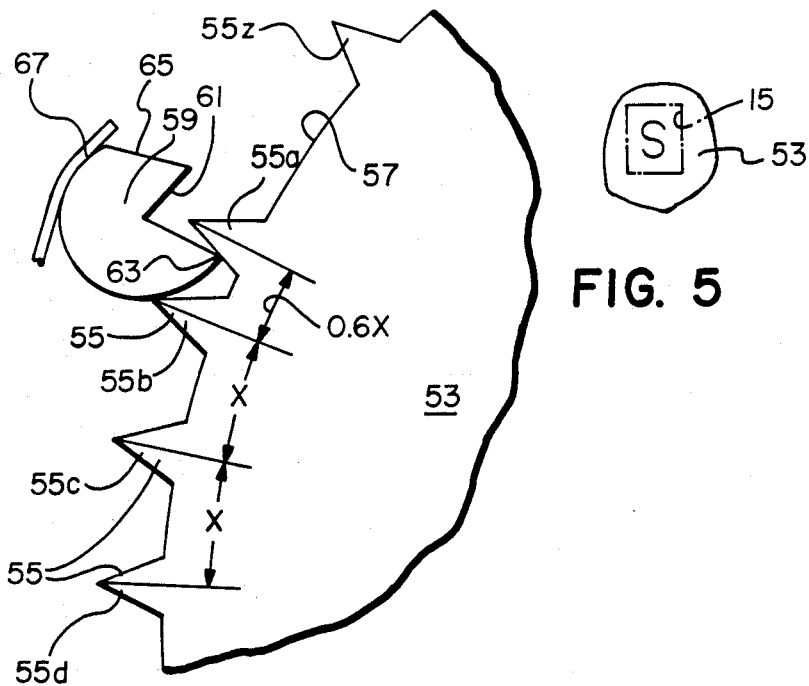
FIG. 5 is a plan view of an improved exposure counter according to a preferred embodiment of the invention, depicting an improved counter disk in its starting setting and an improved drive member in its particular starting angular position.

As shown in FIG. 5, like the prior art counter disk 13, the improved counter disk 53 has a series of peripheral teeth 55, a first one 55a of which is separated from a last one 55z by a gap 57. Each of the teeth 55 except the first one 55a and a second one 55b have the same pitch X, which is equivalent to slightly more than the width of the respective frames of the filmstrip. However, unlike the prior art counter disk 13, the first two teeth 55a and 55b have a common pitch which is a predetermined fraction, for example 0.6X, of the pitch X of the other teeth 55. That is, the first tooth 55a is spaced closer to the second tooth 55b than in the case of the prior art counter disk 13. Moreover, the first tooth 55a is an extra or additional tooth as compared to the number of teeth 11 of the prior art counter disk 13.

Figure 6:
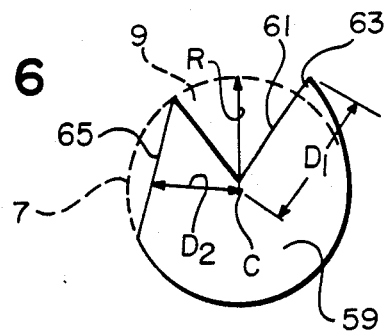
FIG. 6 is a plan view of the improved drive member superimposed over the prior art drive member to compare the difference between the two.
Figure 8:
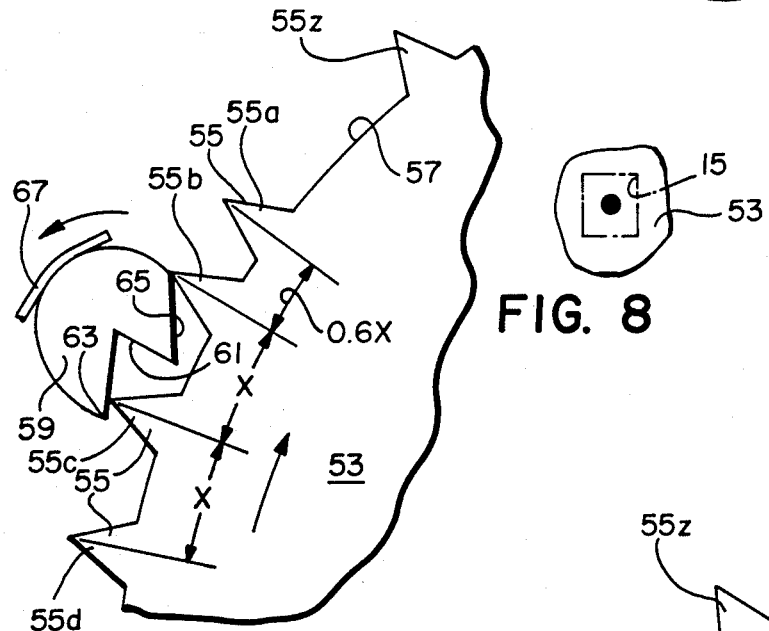

As shown in FIG. 6, like the v-shaped recess 9 of the prior art drive member 7 for receiving the respective peripheral teeth 11 of the prior art counter disk 13, a improved drive member 59 has a v-shaped recess 61 for receiving the respective peripheral teeth 55 of the improved counter disk 53. However, unlike the prior art drive member 7, the improved drive member 59 has a fang or tooth-like peripheral portion 63 located adjacent one side of its v-shaped recess 61 and a substantially flat peripheral portion 65 located adjacent another side of the v-shaped recess. The fang portion 63 is spaced from a center C of rotation of the improved drive member 59 a distance $D_1$ and the flat portion 65 is spaced from the center of rotation a distance $D_2$. Viewing FIG. 6, it can be seen that the distance $D_1$ is greater than the distance $D_2$. Moreover, with regard to the prior art drive member 7, it can be seen that the distance $D_2$ is less than the radius R of that drive member and the distance $D_1$ is greater than such radius.

Figure 11:
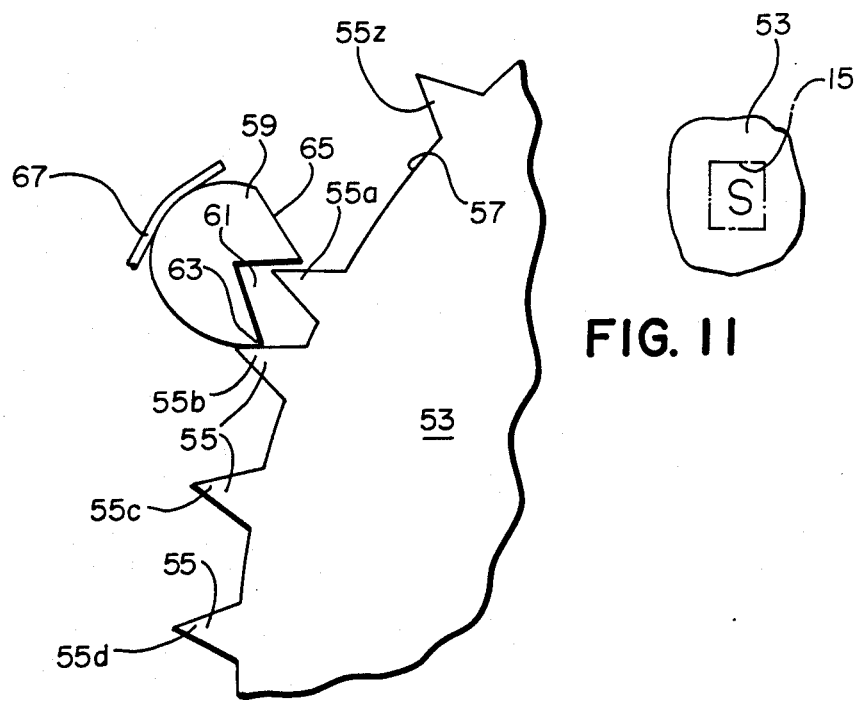
FIG. 11 is a plan view similar to FIG. 5, depicting the improved drive member in another starting angular position.

When the improved counter disk 53 is initialized to its starting setting "S" (in the same manner the prior art counter disk 13 is initialized to its starting setting "S"), the improved drive member 59 is intended to be located partially between the first two teeth 55a and 55b of the improved disk. Of course, the starting angular position of the improved drive member 59 partially between the two teeth 55a and 55b will vary as shown in FIGS. 5 and 11. In operation, neither the fang portion 63 nor the flat portion 65 of the improved drive member 59 will drive the first tooth 55a to rotate the improved counter disk 53, either the fang portion or the flat portion will drive the second tooth 55b to rotate the improved disk, and only the fang portion (not the flat portion) will drive the third tooth 55c and the succeeding teeth 55 to rotate the improved disk. This is due to the relative spacing 0.6X between the first and second teeth 55a and 55b as compared to between the second, third, and succeeding teeth of the improved counter disk 53, and to the distances $D_1$ and $D_2$ of the fang and flat portions 63 and 65 from the center of rotation C of the improved drive member 59.

Figure 7:
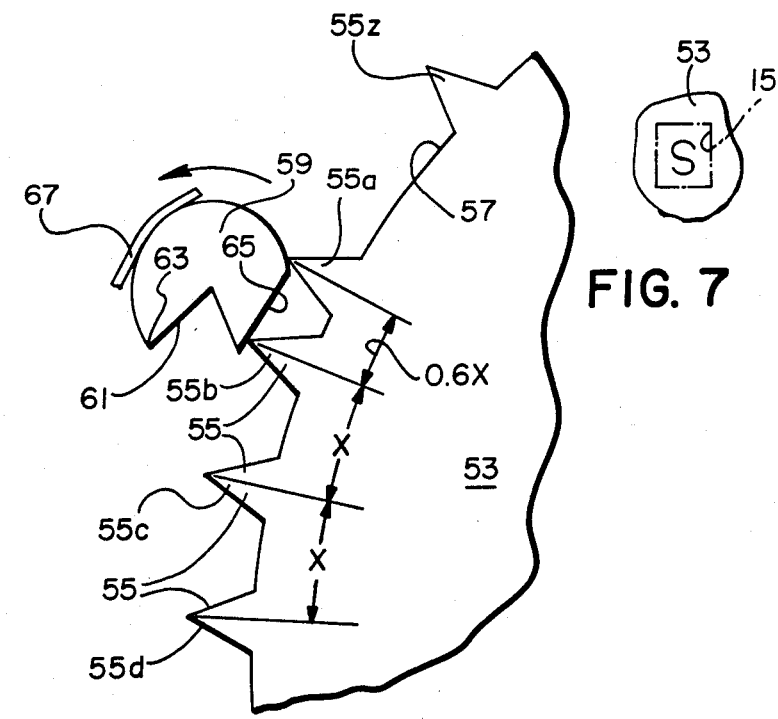
FIGS. 7-10 are plan views similar to FIG. 5, depicted operation of the improved counter disk and the improved drive member.
Figure 9:
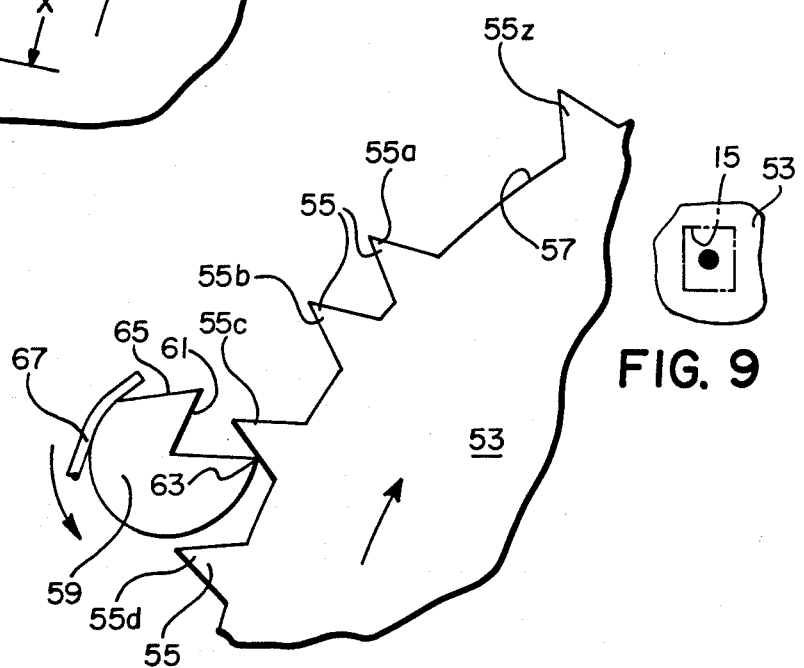
Figure 10:
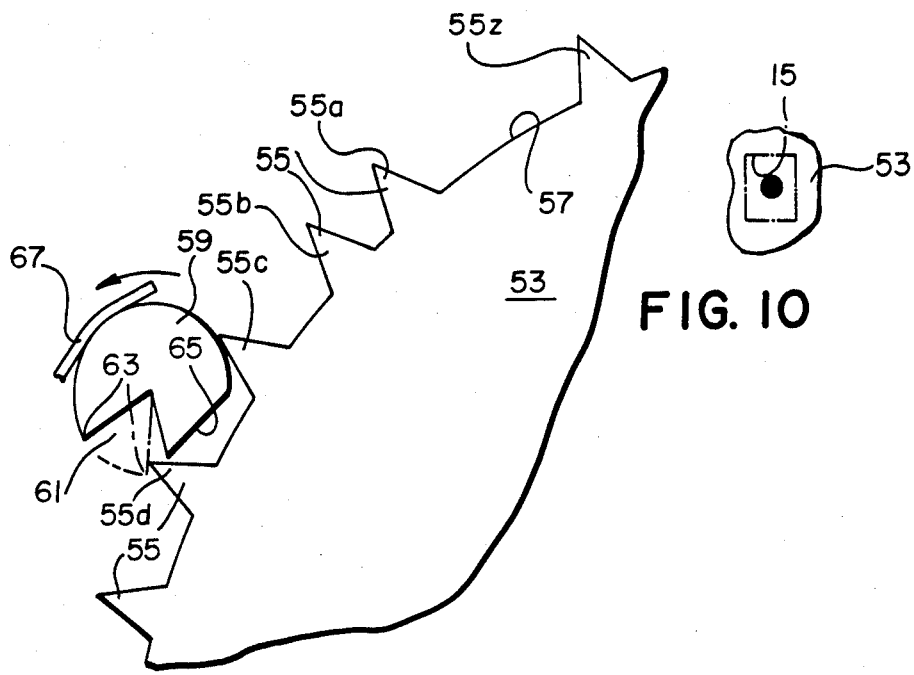

When the improved drive member 59 is rotated from the starting angular position shown in FIG. 5, partially between the first and second teeth 55a and 55b of the improved counter disk 53, it may or may not be rotated a single complete revolution, i.e. 360°, for the reason stated above in the "Description of the Prior Art". As the improved drive member 59 is rotated in a counter-clockwise direction in FIG. 5, its fang portion 63 will not drive the first tooth 55a to rotate the improved counter disk 53 from its starting setting "S". Instead, the improved drive member 59 will slightly back out from between the first and second teeth 55a and 55b of the improved disk 53, against the contrary urging of a retaining spring 67 more clearly shown in FIGS. 1 and 2. A slot 69 in the swing arm 21 makes this possible. As shown in FIG. 7, continued rotation of the improved drive member 59 in the counter-clockwise direction moves its flat portion 65 against the second tooth 55b of the improved disk 53 to begin rotation of the disk from its starting setting "S". As can be appreciated from FIG. 8, before the improved drive member 59 has been rotated sufficiently to bring its fang portion 63 against the third tooth 55c of the improved disk 53, the disk will have been rotated to its first intermediate setting ".". Consequently, the cam rise 35 of the camming disk 37 (shown in FIG. 1) will have closed the override switch 33 to nullify the metering switch. At this time, as can be seen by comparing FIGS. 5 and 8, the improved drive member 59 has been rotated significantly less than a first complete revolution from its starting angular position. However, since the override switch 33 is then closed, the problem of de-energizing the motorized film transport prematurely, which is discussed at length in the "Description of the Prior Art", is thereby solved. As can be appreciated from FIG. 9, continued rotation of the improved drive member 59 in the counter-clockwise direction moves its fang portion 63 to drive the third tooth 55c of the improved disk 53 to rotate the disk from its first intermediate setting "." to its second intermediate setting ".". This is timed to concur with the cam descent 39 of the camming disk 37 moving alongside the override switch 33 to permit the switch to re-open. FIG. 9 shows the improved drive member 59 at the end of its first complete revolution. As can be appreciated from FIG. 10, further rotation of the improved drive member 59 in the counter-clockwise direction, after beginning a second complete revolution, causes its flat portion 65 to swing past the fourth tooth 55d of the improved disk 53, without contacting that tooth, and moves its fang portion 63 against the fourth tooth to begin to rotate the disk from its second preliminary setting "." to its first numbered setting "1". Arrival of the improved disk 53 at its first numbered setting "1" is timed to coincide with advance of the filmstrip to position a first frame for exposure and opening of the metering switch to de-energize the motorized film transport (as in the prior art example).

When the improved drive member 59 is rotated from the starting angular position shown in FIG. 11, partially between the first and second teeth 55a and 55b of the improved counter disk 53, and the drive member is not rotated a single complete revolution, i.e. 360°, for the reason stated above in the "Description of the Prior Art", it will still rotate the improved disk from the starting position "S" to the first intermediate setting ".". By comparing FIGS. 4 and 11, it can be seen that the starting angle of the improved drive member 59 in FIG. 11 is similar to the starting angle of the prior art drive member 7 in FIG. 4. However, even in this instance, since the improved drive member 59 can rotate the improved counter disk 53 sufficiently to close the override switch 33, no problem results as in the prior art example.

Accordingly, the improved counter disk 53 and the improved drive member 59 operate irrespective of the starting angular position of the drive member to enable the drive member to rotate the disk substantially the same angular distance from its starting setting "S", when the drive member is rotated less than a first complete revolution, as the angular distance the disk is rotated from a succeeding setting, such as one of its first or second intermediate settings "." and ".", when the drive member is rotated a subsequent complete revolution. Moreover, the improved counter disk 53 and the improved drive member 59 operate in dependence upon the starting angular position of the drive member for enabling the drive member to rotate the disk a further angular distance from its starting setting, when the drive member is rotated a first complete revolution, than the angular distance the disk is rotated each time the drive member is rotated a successive complete revolution. See FIGS. 5-9.

The invention has been described with reference to a preferred embodiment. However, it will be appreciated that variations and modifications can be effected within the ordinary skill in the art without departing from the scope of the invention.

I claim:

1. An improved film exposure counter of the type wherein (a) a counter member has a plurality of successive settings including a starting setting and is rotatable from the starting setting to the other settings and (b) a drive member is rotated in engaged relation with said counter member to rotate the member from its starting setting to its other settings, and wherein the improvement comprises:

cooperating means arranged on said counter member and said drive member, operating irrespective of the starting angular position of the drive member, for enabling said drive member to rotate said counter member substantially the same angular distance from its starting setting, when the drive member is rotated less than a normal distance, as the angular distance the counter member is rotated from its other settings, when the drive member is rotated its normal distance.

2. An improved film exposure counter for a photographic camera wherein (a) a counter disk has a plurality of successive settings including a starting setting and is rotated from the starting setting to the other settings to indicate respective film exposures in the camera and (b) a drive member is rotated in engaged relation with said counter disk to rotate the disk from its starting setting to its other settings, and wherein the improvement comprises:

cooperating means arranged on said counter disk and said drive member, operating irrespective of the starting angular position of the drive member, for enabling said drive member to rotate said counter disk substantially the same angular distance from its starting setting, when the drive member is rotated less than one complete revolution, as the angular distance the counter disk is rotated from its other settings, when the drive member is rotated one complete revolution.

3. An exposure counter as recited in claim 2 wherein said cooperating means operates in dependence upon the starting angular position of said drive member for enabling the drive member to rotate said counter disk a further angular distance from its starting setting, when the drive member is rotated a first complete revolution, than the angular distance the counter disk is rotated each time the drive member is rotated a successive complete revolution.

4. An exposure counter as recited in claim 3 wherein said cooperating means operates in dependence upon the starting angular position of said drive member for enabling the drive member to rotate said counter disk from its starting setting to a successive setting following the next setting, when the drive member is rotated the first complete revolution.

5. An exposure counter as recited in claims 2 or 4 wherein said counter disk includes respective teeth arranged serially for engagement with said drive member to rotate the disk, each of said teeth except the first two teeth having the same pitch, and said first two teeth having a common pitch which is a predetermined fraction of the pitch of the other teeth, and wherein said drive member includes relatively short drive means for only engaging the second tooth to rotate said counter disk and relatively long drive means for engaging said second tooth and the other teeth to rotate the disk.

6. An exposure counter as recited in claim 5 wherein said drive member has a center of rotation, said relatively short drive means is a substantially flat peripheral portion of the drive member, and said relatively long drive means is a tooth-like peripheral portion of the drive member, said tooth-like portion being spaced from the center of rotation a distance which is greater than the distance said flat portion is spaced from the center of rotation.

7. An exposure counter as recited in claim 2 further wherein a normally open override switch is temporarily closed to nullify a film metering switch after said counter disk is rotated from its starting setting, to permit the disk to be rotated to more than one setting without interruption, and wherein the improvement further comprises:

cam means operating irrespective of the starting angular position of said drive member, and mounted for temporarily closing said override switch after the disk is rotated from its starting setting, when the drive member is rotated less than a first complete revolution.

8. An improved film exposure counter for a photographic camera wherein (a) a rotatable counter disk is initialized to a starting setting and (b) a drive member is rotated in engaged relation with said counter disk to rotate the disk, and wherein the improvement comprises:

means operating in dependence upon the starting angular position of said drive member for enabling the drive member to rotate said counter disk a further angular distance from its starting setting, when the drive member is rotated a first complete revolution, than the angular distance the counter disk is rotated each time the drive member is rotated a successive complete revolution.

9. An exposure counter as recited in claim 8 wherein said counter disk has a plurality of successive settings including its starting setting, said drive member rotates said counter disk from its starting setting to its other settings to indicate respective film exposures in the camera, and said enabling means operates in dependence upon the starting angular position of said drive member for enabling the drive member to rotate said counter disk from its starting setting to a successive setting following its next setting, when the drive member is rotated the first complete revolution.

* * * * *